3,025,839
INTERNAL COMBUSTION ENGINES OF THE LIQUID FUEL INJECTION COMPRESSION IGNITION TYPE
Philip Aubrey Thornton Crowther, Knowle, and John Swaine, Coventry, England, assignors to The Rover Company Limited, Meteor Works, England, a British company
Filed June 22, 1959, Ser. No. 821,752
Claims priority, application Great Britain July 1, 1958
14 Claims. (Cl. 123—32)

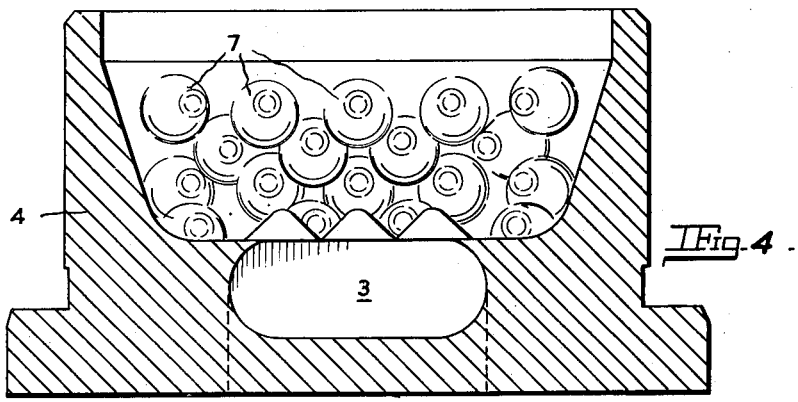
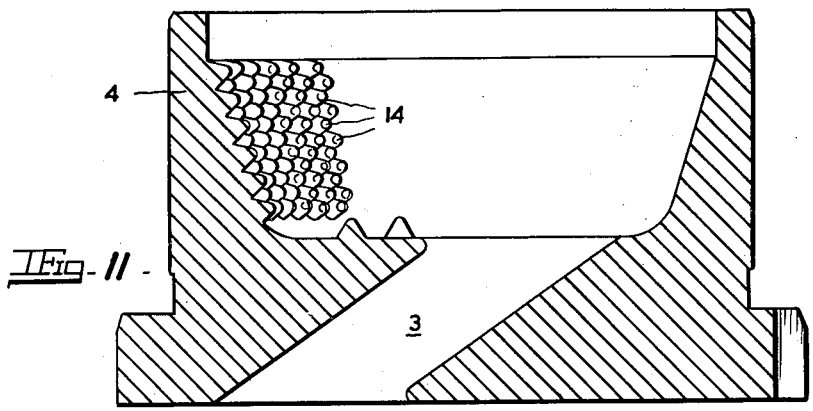

This invention relates to internal combustion engines of the liquid fuel injection compression ignition type and of the kind in which during each compression stroke a substantial proportion of the air charge is forced through a constricted passage (hereinafter referred to as a throat), or in some cases more than one such passage, into a pocket (usually referred to as a pre-combustion chamber), the form of the pocket and the direction of the throat or throats being such that the air charge thus forced into the chamber is caused to rotate bodily in the chamber about an axis and the fuel being injected into such rotating air charge from a point within the chamber or passage.

For convenience herein it will be assumed that there is only one throat, as is usually the case, and this is to be understood as including arrangements employing two or more closely adjacent throats and, where the context permits, two or more widely separated throats are sometimes used.

It is an object of the invention to provide an improved construction or arrangement of pocket for engines of the kind referred to which will tend to reduce or eliminate the so-called Diesel knock usually experienced in existing engines of this type, to make the general operation of the engine quieter and smoother over its normal speed and power range, and to reduce maximum cylinder pressure, and rate of pressure rise.

To this end in an internal combustion engine of the liquid fuel injection compression ignition type and of the kind referred to according to the present invention there are formed or provided on at least a part of the surface of the pocket over which circumferential or outer portions of the air charge sweep a series of closely spaced surface irregularities (projections or depressions) such as to disturb to a substantial degree the smooth flow of the circumferential portions of the rotating air charge which sweep over and/or between them and substantially increase the total surface area of the part of the surface on which they are formed as compared with a smooth surface of the same overall dimensions.

It will be appreciated that the expression "circumferential portions of the rotating air charge" is to be interpreted as meaning those portions of the rotating air charge which lie close to the areas of the surface of the pocket more remote from the axis of rotation and therefore sweep over such areas with substantial velocity.

Preferably the projections or depressions or a substantial portion of them are disposed in an area towards which the liquid fuel is injected. Thus in one preferred arrangement the projections or depressions are limited to an area of the surface of the pocket towards which the fuel is injected and which is disposed adjacent to the mouth of the throat and in advance of the mouth of the throat considered in relation to the direction of flow of the circumferential portions of the rotating air charge. Thus when the invention is applied to an engine of the kind referred to in which, as will generally be the case, the throat and a substantial proportion of the inner surface of the pocket are formed in a plug-like member having limited heat-conducting contact with the cooled surrounding walls, the projections or depressions may conveniently be formed on the surface of the cavity in the plug which forms that part of the surface of the pocket in advance of the mouth of the throat, towards which part of the surface of the pocket liquid fuel is injected usually in a generally downstream direction, that is to say, in a direction having a substantial component in the direction of the flow of the circumferential portions of the rotating air charge into which the fuel is injected.

The form of the projections or depressions may vary considerably but in one preferred arrangement there are projections of generally conical or thimble-like form with each projection spaced from its neighbours by depressed areas of the surface. Alternatively the projections may constitute a combination of ridge-like and thimble-like projections, but in every case, whether projections or depressions are used, they would preferably extend over an area of the surface of the pocket representing not less than 1% of the total area of such surface and be of a form such as to increase the surface area of the part of the pocket surface over which they extend by not less than 10% as compared with a smooth surface representing the mean contour of that part of the pocket surface.

Moreover, the height of each projection or depth of each depression will preferably be not less than .009″, the arrangement in every case being, as stated, such as to disturb to a substantial degree the smooth flow of the circumferential portions of the rotating air charge when they encounter the projections and to provide a substantial increase in the surface area of the part of the surface on which they are formed as compared with a smooth surface of the same overall dimensions.

Where depressions are used instead of projections they may be wholly or in part in the form of dimples which may be closely or more widely spaced, and/or grooves which may extend in a direction tangentially parallel to, at right angles to, or inclined to the general direction of flow of the circumferential portions of the rotating air charge over and through them.

Combinations of depressions and projections may be used. It will be understood that in any case, if projections are placed so close together that their bases overlap they become almost indistinguishable from closely placed depressions.

The invention may be applied to internal combustion engines of the kind referred to in which the pocket is of various forms but is particularly applicable to engines of the so-called "Comet" type, that is to say engines in which the axis of the throat lies in a plane normal to the axis about which bodily rotation of the air charge occurs in the pocket and is tangential to a circle having such axis for centre.

The invention will now be further described and illustrated by way of example with reference to the accompanying drawings, in which:

FIGURE 4 is a vertical section on the line 4—4 in FIGURE 3;

FIGURES 6 to 11 are vertical sections showing other possible modified forms of hot plug provided with projections;

FIGURE 12 is a similar vertical section showing a hot plug provided with depressions instead of projections;

FIGURE 13 is a scrap section to a larger scale, showing one of the depressions of FIGURE 12;

FIGURES 14 and 15 are views similar to FIGURES 12 and 13, showing another form of depression;

FIGURE 16 is a scrap view looking in the direction of the arrow A in FIGURE 15; and FIGURES 17 and 18 are views similar to FIGURES 15 and 16, showing a further form of depression.

Figure 1:
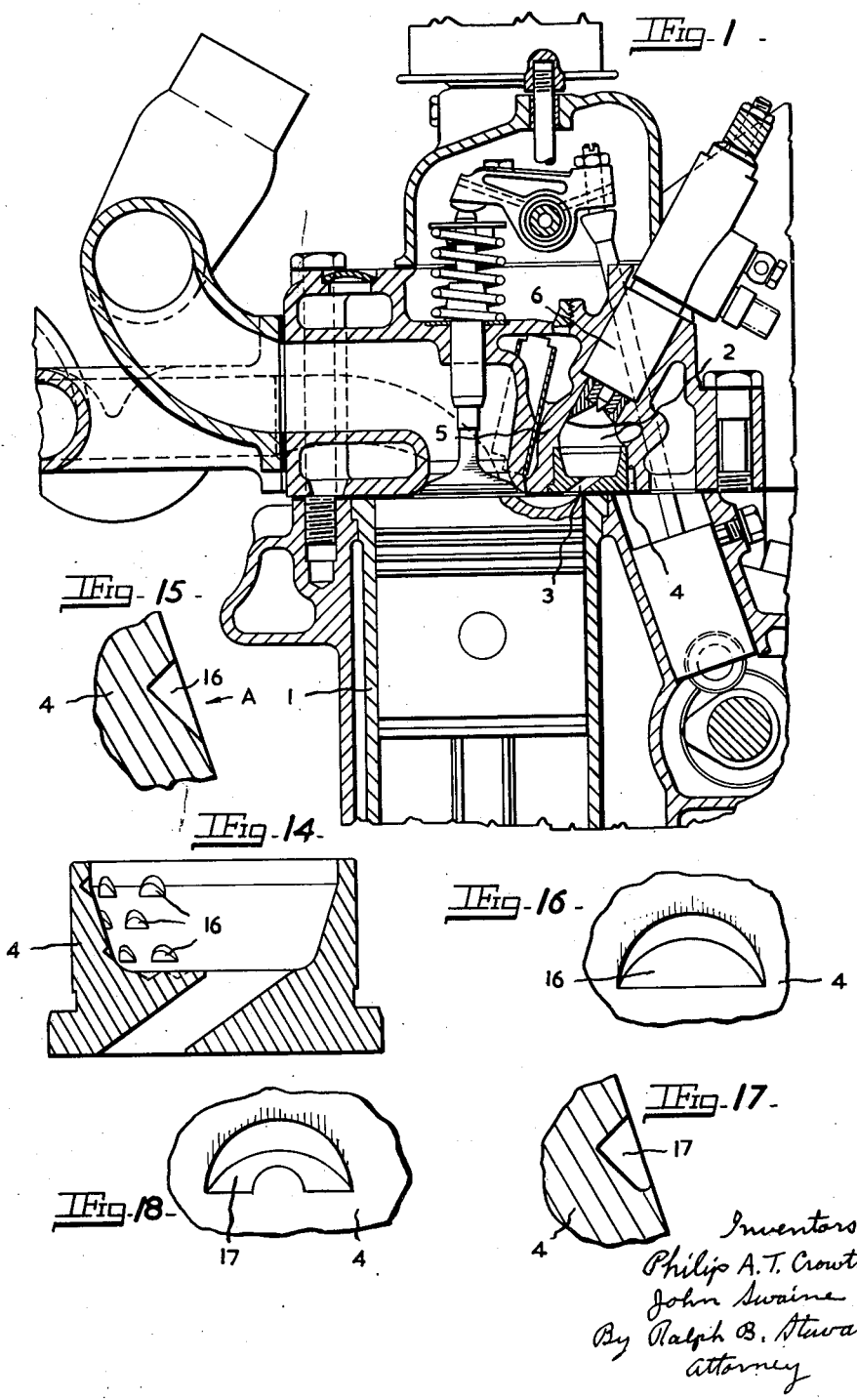
FIGURE 1 is a transverse vertical section through an engine to which the invention may be applied.

Referring first to FIGURE 1, the engine illustrated is of the liquid fuel compression-ignition type, in which there is associated with each cylinder 1 a pre-combustion chamber 2 into which a substantial proportion of the air charge is forced during each compression stroke through a constricted passage 3 known as a throat. The engine illustrated has the "Comet" type of pre-combustion chamber, in which the direction of the throat 3 is such that the air charge enters the chamber 2 in a tangential direction and the lower part of the chamber, into which the throat 3 opens, is formed by an insert or hot plug 4, which has limited heat-conducting contact with the surrounding cooled wall 5 of the cylinder head. The fuel is injected tangentially into the rotating air charge in a downstream direction by means of an injector 6.

The pre-combustion chamber 2 is of spherical or modified spherical shape and normally has walls which are as smooth as the processes used in the manufacture of the cylinder head and the insert or plug will allow. The general type of engine illustrated in FIGURE 1 is well-known and need not be further described.

Figure 2:
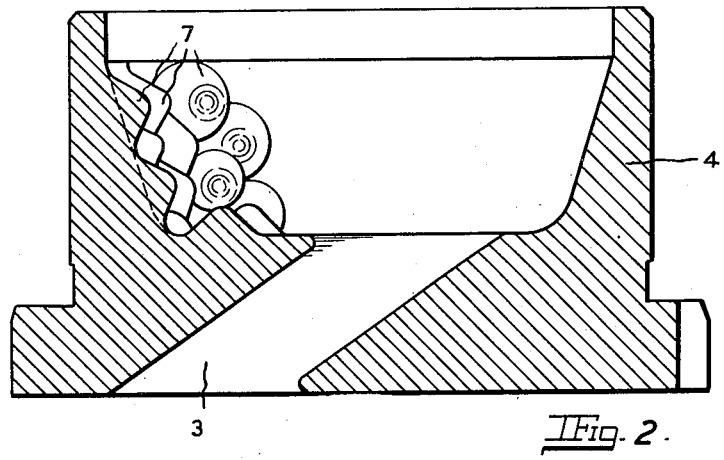
FIGURE 2 is a vertical section to a large scale through one example of a hot plug embodying the invention and forming the lower part of the pre-combustion chamber, the section being taken on the line 2—2 in FIGURE 3.
Figure 3:
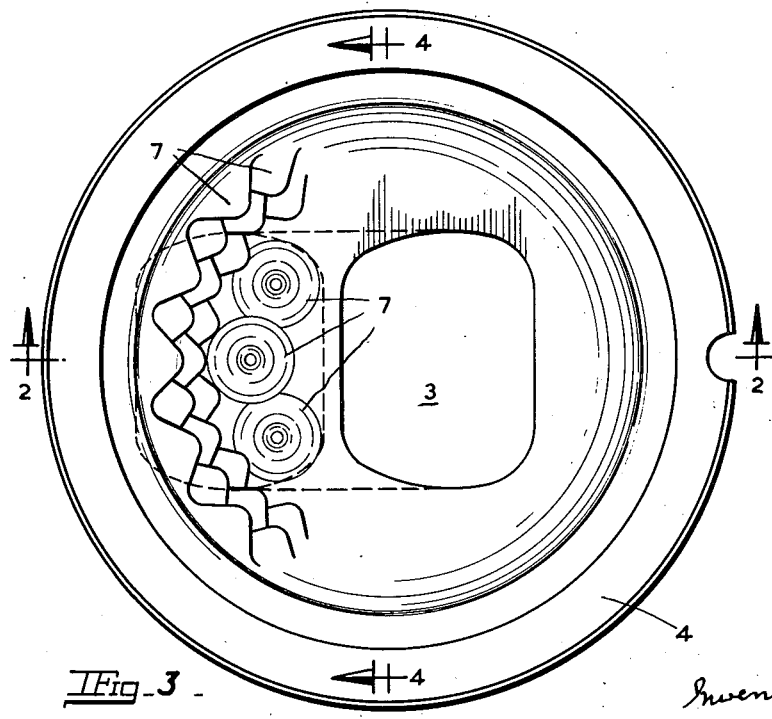
FIGURE 3 is a plan view of the hot plug, looking from above in FIGURE 2.

FIGURES 2 to 4 show the plug or insert of the pre-combustion chamber modified in accordance with the invention. This plug is of a chamber of the type known as the Mark V Comet type, in which the lower part of the chamber is of frusto-conical shape, merging into a flat base portion into which the throat 3 opens. Instead of the interior surface of the plug being smooth as in existing chambers, it is provided, over that part of its surface towards which the charge is directed by the injector 6, with a series of projections 7, each of conical shape with a rounded top. The projections 7 have a cone angle of 90° and the bases of the projections merge into one another; the height of each projection above the mean level of their bases is 0.062 of an inch. The axes of those projections on the frusto-conical wall are directed substantially towards the vertical axis of the chamber, and as will be seen from FIGURE 4, they cover an arc of approximately 115° of the curved wall of the plug 4. There is also a row of projections on the flat base of the chamber between the remaining projections and the mouth of the throat 3.

The projections 7 on the curved wall are arranged in four rows each extending across the direction of movement of the circumferential path of the air charge. The projections of each row are staggered with respect to the row above, so that a stream of air that passes undisturbed between the projections of one row will impinge on and be deflected by a projection of the row below.

It will be appreciated that, as the air charge in the pre-combustion chamber is rotating in a counter-clockwise direction as viewed in FIGURE 1, and as the fuel is injected tangentially into it in a downstream direction, the eddies produced by the projections 7 in the circumferential portions of the rotating air charge will ensure intimate mixing of the fuel and air and this will help to ensure that as little as possible of the unburnt fuel reaches the walls of the chamber.

Figure 5:
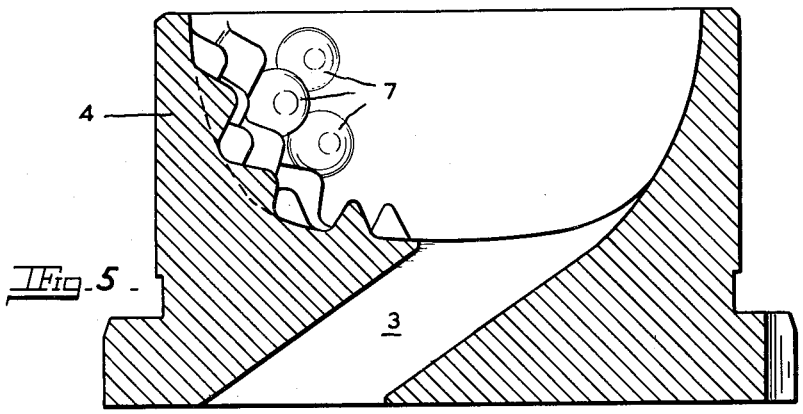
FIGURE 5 is a vertical section of a hot plug having a modified form of pre-combustion chamber provided with projections similar to those shown in FIGURES 2 to 4.

FIGURE 5 shows a hot plug with projections 7 similar to those of FIGURES 2 to 4, but applied to a chamber of the type known as the Mark III Comet, which is of more nearly spherical shape than the Mark V chamber.

Figure 6:
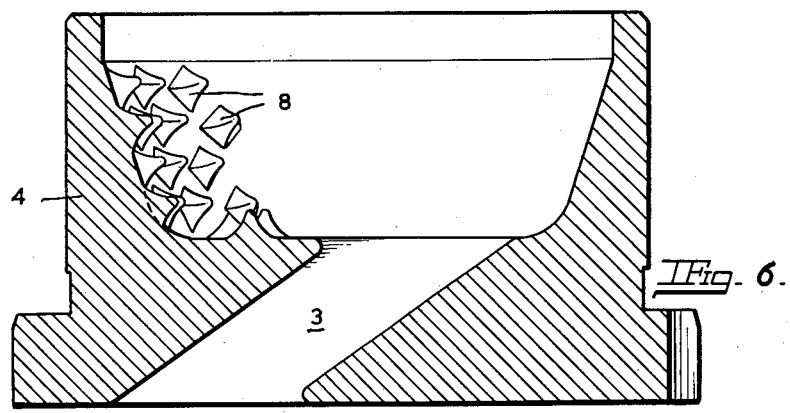

FIGURES 6 to 11 all show projections applied to the Mark V shape of chamber. In FIGURE 6 they are of pyramidal shape, as indicated at 8, and each has a height of .060 of an inch, on a base which is 0.070 of an inch square. Those on the frusto-conical wall cover an arcuate region of 108°, extending symmetrically on both sides of the vertical plane containing the axis of the throat 3.

Figure 7:
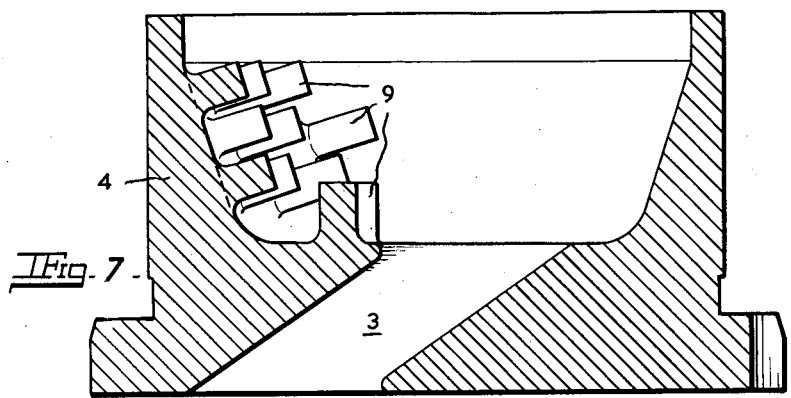

FIGURE 7 shows cylindrical projections 9. Those which extend from the frusto-conical wall have their axes parallel to one another and parallel to the vertical plane containing the axis of the throat 3. In the plug shown in FIGURE 8 there are conical projections 10 similar to the projections 7 of FIGURES 2 to 4, but of smaller cone angle and with more pointed tips.

Figure 9:
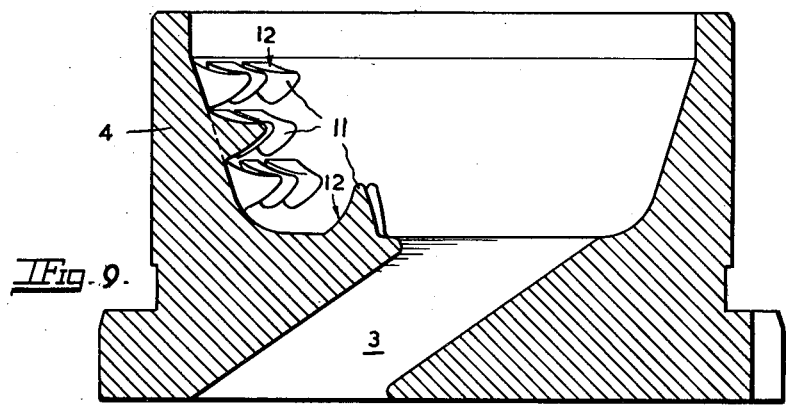
Figure 8:
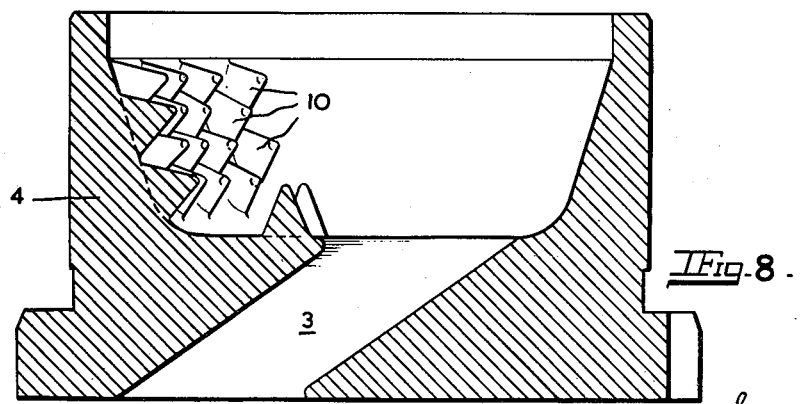

In the form of plug shown in FIGURE 9 the projections, shown at 11, have a slightly hooked shape, those faces which are directed towards the air and fuel charges being slightly concave, as indicated at 12.

Figure 10:
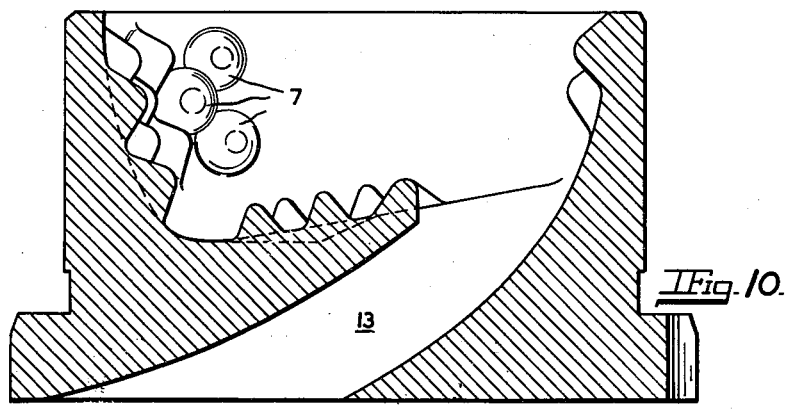

FIGURE 10 shows projections 7, the same shape as those of FIGURES 2 to 4 and 5, applied to a modified Mark III form of chamber, in which the throat, instead of being straight, is curved as shown at 13, and the base of the chamber is tilted at an angle of 10° to the horizontal. (It is to be understood that we use the terms "vertical" and "horizontal" for convenience, without in any way intending to imply the chamber must be any particular way up.) The base has more projections on it than the embodiment of FIGURES 2 to 4 and in addition there are projections on that wall opposite the wall carrying the majority of the projections, i.e. on that wall which is immediately downstream of the mouth of the throat 13.

FIGURE 11 shows a plug with projections 14 of similar shape to the projections of FIGURES 2 to 4 but much smaller, and present in much greater numbers. They are only 0.038 of an inch high and have a cone angle of sixty degrees.

FIGURES 12 to 18 show the use of depressions instead of projections. In the plug shown in FIGURES 12 and 13 there are shallow conical dimples 15 arranged on that part of the frusto-conical wall towards which, in the assembled chamber, the fuel is directed and there are also dimples in the base of the chamber. Those on the wall are arranged in four staggered rows, so that air passing between adjacent dimples of one row will pass straight into a dimple of the row below.

FIGURES 14 to 16 show an alternative form of depression 16, in the form of a semicircular wedge, which is of zero depth at its diametral edge and of maximum depth at the opposite edge. The deepest portion faces the airstream. FIGURES 17 and 18 show a modified form 17 of this depression, in the form of a portion of a ring.

It will be understood that the scope of the invention cannot be limited to any particular size or shape of projection or depression, since there is a multitude of forms that will serve the purpose of upsetting the air flow in the region where the fuel comes into contact with the charge and thus ensuring intimate contact between the fuel droplets and the air. Obviously very small rugosities, indistinguishable from mere casting imperfections, would not produce appreciable disturbance, and in general it is found that the height or depth of the projections or depressions should be not less than 0.009 of an inch. Likewise, they should be of a form such as to increase the area of that part of the chamber wall over which they extend by at least 10% as compared with the smooth part of the same overall dimensions, and this part should, to be of any real effect, cover at least 1% of the total area of the chamber wall.

We claim:

1. In an internal combustion engine of the liquid fuel compression ignition type in which during each compression stroke substantial proportion of the air charge is forced through at least one constricted passage into a pre-combustion chamber, means to accept the forced air charge into the chamber so that the air rotates therein, means to inject fuel into the air charge from a point within the chamber, the axis of said passage lying in a plane normal to the axis about which bodily rotation occurs and tangential to a circle having such axis for centre, a hot plug, said hot plug having limited heat-conducting contact with said engine, and said hot plug having formed in it a recess forming substantially that half of said chamber with which said passage communicates, the recess having a substantially frusto-conical shape terminating in a flat base into which said passage opens, and a series of closely spaced surface irregularities disposed on said frusto-conical wall such as to disturb to a substantial degree the smooth flow of the circumferential portions of the rotating air charge.

2. A chamber as claimed in claim 1, comprising further surface irregularities in that part of said base which lies between the passage and the part of said frusto-conical wall that carries said first-mentioned surface irregularities.

3. For the precombustion chamber of an internal combustion engine of the liquid fuel compression ignition type in which during each compression stroke a substantial proportion of an air charge is forced through at least one constricted passage into said precombustion chamber, means to accept the forced air charge into the chamber so that the air rotates therein, means to inject fuel into the air charge from a point within the chamber, a plug having therein a recess to form substantially half of said chamber, the walls of said recess being provided over at least a part of their area with a roughened region of substantial extent comprising a series of rows of closely spaced surface irregularities of at least .009 of an inch in height and of a form such that, when said plug is used in said chamber, said surface irregularities serve to disturb to a substantial degree the smooth flow of the circumferential portions of the rotating air charge, thereby causing the fuel and air charge to be intimately mixed.

4. An internal combustion engine of the liquid fuel compression ignition type in which during each compression stroke a substantial proportion of an air charge is forced through at least one constricted passage into a precombustion chamber, said engine comprising a cylinder, a cylinder head, a piston slidable in said cylinder, a precombustion chamber formed in said cylinder head, a transfer passage in said cylinder head forming a communication between said cylinder and pre-combustion chamber, said pre-combustion chamber being of generally spheroidal shape and said transfer passage being disposed to direct an air charge passing therethrough from said cylinder in a tangential direction with respect to said chamber, to cause said air charge to rotate within said chamber about an axis which is perpendicular to a plane that passes through the center of said chamber and contains the axis of said transfer passage, fuel injector means, said fuel injector means being disposed in a wall of said chamber in a position to direct a fuel charge tangentially into said chamber in a direction downstream with respect to said rotating air charge, and a roughened region on the internal wall of said chamber at a point on said wall separate from said transfer passage, said roughened region comprising a series of rows of closely spaced surface irregularities such as to disturb to a substantial degree the smooth flow of outer portions of said rotating air charge and thereby cause the intimate mixing of the fuel and air.

5. An engine as recited in claim 4 wherein at least the major portion of said roughened region is disposed over that portion of said chamber wall towards which said fuel injector means directs the fuel charge.

6. An engine as recited in claim 5 wherein said surface irregularities are disposed in rows extending in directions transverse to the direction of movement of the circumferential portion of the rotating air charge over them.

7. An engine as recited in claim 4 wherein said surface irregularities have a height of at least 0.009 of an inch.

8. An engine as recited in claim 7 in which said surface irregularities are projections of pyramidal form.

9. An engine as recited in claim 8 wherein said projections have concave faces on those sides which face towards the direction from which the circumferential portion of the air charge approaches.

10. An engine as recited in claim 7 in which said surface irregularities are projections of conical form.

11. An engine as recited in claim 7 in which said surface irregularities are depressions of conical form.

12. An engine as recited in claim 7 in which said surface irregularities are depressions of a part circular shape with their deepest portions facing the airstream.

13. An engine as recited in claim 4 wherein said surface irregularities are of a form such that they increase the area of said roughened region by at least 10% over the area of a smooth wall part of the same overall dimensions.

14. An engine as recited in claim 4 comprising a hot plug, said hot plug having a limited heat-conducting contact with the engine and said hot plug being formed having a recess defining substantially that half of said chamber with which said passage communicates.

References Cited in the file of this patent

UNITED STATES PATENTS

| | | |
|---|---|---|
| 2,746,433 | Nallinger | May 22, 1956 |
| 2,762,348 | Meurer | Sept. 11, 1956 |
| 2,873,727 | Meurer | Feb. 17, 1959 |
| 2,942,591 | Meurer | June 28, 1960 |

FOREIGN PATENTS

| | | |
|---|---|---|
| 113,132 | Sweden | Feb. 6, 1945 |
| 489,496 | Italy | Jan. 22, 1954 |